(12) United States Patent
Dudar et al.

(10) Patent No.: US 10,472,877 B2
(45) Date of Patent: Nov. 12, 2019

(54) VEHICLE FUEL COOLING

(71) Applicant: Ford Global Technologies, LLC, Dearborn, MI (US)

(72) Inventors: Aed M. Dudar, Canton, MI (US); Scott Alan Bohr, Novi, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 143 days.

(21) Appl. No.: 15/498,047

(22) Filed: Apr. 26, 2017

(65) Prior Publication Data

US 2018/0314248 A1 Nov. 1, 2018

(51) Int. Cl.
| G07C 5/08 | (2006.01) |
| E05F 15/71 | (2015.01) |
| B60G 17/016 | (2006.01) |
| B60G 17/0185 | (2006.01) |
| B60G 17/0165 | (2006.01) |
| F01P 7/00 | (2006.01) |
| F01P 7/16 | (2006.01) |

(52) U.S. Cl.
CPC ............ *E05F 15/71* (2015.01); *B60G 17/016* (2013.01); *B60G 17/0165* (2013.01); *B60G 17/0185* (2013.01); *F01P 7/00* (2013.01); *F01P 7/167* (2013.01); *G07C 5/0808* (2013.01); *B60G 2400/70* (2013.01); *B60G 2600/08* (2013.01); *E05Y 2900/536* (2013.01); *F01P 2025/32* (2013.01); *F01P 2037/02* (2013.01)

(58) Field of Classification Search
CPC .......... B60W 50/0097; B60W 40/076; B60W 2510/0676; B60W 2250/12; G07C 5/0808; G05D 1/0088; B60G 17/0165; B60G 17/0185; B60G 17/016; B60G 2600/08; B60G 2400/70; E05F 15/71; E05Y 2900/536; F01P 7/167; F01P 7/00; F01P 2025/32; F01P 2037/02
See application file for complete search history.

(56) References Cited

U.S. PATENT DOCUMENTS

| 3,961,605 A | 6/1976 | Kaltner |
| 5,707,315 A | 1/1998 | Furukawa et al. |
| 8,849,503 B1 * | 9/2014 | Dudar ............... F02M 25/0809 701/32.3 |
| 9,050,885 B1 | 6/2015 | Dudar et al. |
| 9,422,002 B2 | 8/2016 | Li et al. |

(Continued)

FOREIGN PATENT DOCUMENTS

| DE | 102014211550 B3 | 12/2015 |
| JP | 4958107 B2 | 3/2012 |
| WO | 2015114434 A1 | 8/2015 |

OTHER PUBLICATIONS

Search Report from United Kingdom Intellectual Property Office dated Oct. 16, 2018 regarding Application No. GB1806595.3 (4 pages).

*Primary Examiner* — Genna M Mott
(74) *Attorney, Agent, or Firm* — Frank A. MacKenzie; Bejin Bieneman PLC

(57) ABSTRACT

An engine coolant temperature at an expected time of activation of a vehicle is predicted. Upon determining that the predicted engine coolant temperature is greater than an ambient air temperature by a temperature threshold, a vehicle component is actuated at a time determined based on the expected time of activation.

18 Claims, 5 Drawing Sheets

(56) References Cited

U.S. PATENT DOCUMENTS

| | | | |
|---|---|---|---|
| 9,512,791 B1 | 12/2016 | Dudar et al. | |
| 2011/0153140 A1* | 6/2011 | Datta | B60R 16/02 |
| | | | 701/31.4 |
| 2015/0025722 A1* | 1/2015 | Pearce | F02D 41/22 |
| | | | 701/22 |
| 2015/0217622 A1* | 8/2015 | Enomoto | B60H 1/00878 |
| | | | 165/42 |
| 2016/0368366 A1* | 12/2016 | Miller | B60K 11/085 |
| 2017/0124873 A1* | 5/2017 | Semsey | G01C 21/3685 |
| 2018/0224861 A1 | 8/2018 | Dudar | |

* cited by examiner

VEHICLE FUEL COOLING

BACKGROUND

Vehicles can use fluid fuels in a vehicle propulsion system. The fluid fuels may evaporate when a temperature in a fuel tank rises. The vehicle may perform a diagnostic to detect leaks in a fuel line. Evaporated fluid fuel may generate noise during the diagnostic. Typically, the diagnostic is performed several hours after the vehicle has deactivated to allow the evaporated fuel to condense.

DETAILED DESCRIPTION

Figure 1:
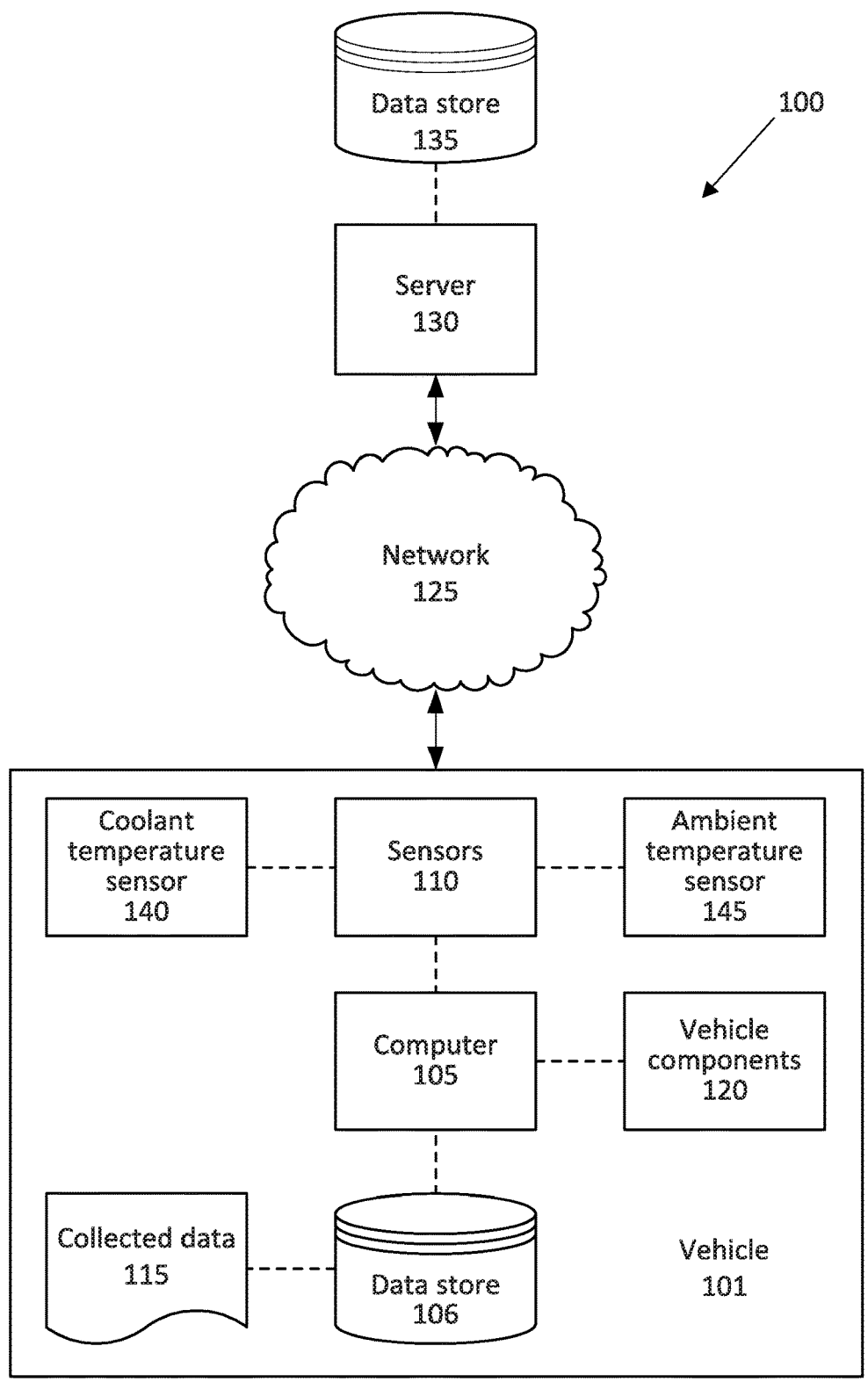
FIG. 1 is a block diagram of an example system for performing a fuel line leak diagnostic.

A system includes a computer programmed to predict an engine coolant temperature at an expected time of activation of a vehicle. Upon determining that the predicted engine coolant temperature is greater than an ambient air temperature by a temperature threshold, the computer is programmed to actuate a vehicle component at a time determined based on the expected time of activation.

The computer can be further programmed to perform a fuel line leak diagnostic upon activation of the vehicle when the predicted engine coolant temperature is within the temperature threshold of the ambient air temperature.

The vehicle component can be a suspension and the computer can be further programmed to actuate the suspension to raise a front end of the vehicle.

The vehicle component can be a front hood of the vehicle and the computer can be further programmed to open the front hood.

The vehicle component can be a propulsion and the computer can be further programmed to identify a roadway having a road grade greater than a road grade threshold and to actuate the propulsion to move the vehicle to the identified roadway.

The vehicle component can be a propulsion and the computer can be further programmed to determine a wind direction and to actuate the propulsion to align the vehicle along the wind direction.

The computer can be further programmed to collect a plurality of measurements of the engine coolant temperature and to predict the engine coolant temperature at the expected time of activation of the vehicle based on the measurements. Each of the plurality of measurements can be collected at a predetermined period of time that is measured from one of a previous measurement and a time of deactivation of the vehicle.

The computer can be further programmed to detect an insolation on the vehicle and to actuate the propulsion to move the vehicle when the insolation is above an insolation threshold. The computer can be further programmed to identify a location having an insolation below the insolation threshold and to actuate the propulsion to move the vehicle to the location.

A method includes predicting an engine coolant temperature at an expected time of activation of a vehicle. The method further includes, upon determining that the predicted engine coolant temperature is greater than an ambient air temperature by a temperature threshold, actuating a vehicle component at a time based on the expected time of activation.

The method can further include performing a fuel line leak diagnostic upon reactivation of the vehicle when the predicted engine coolant temperature is within the temperature threshold of the ambient air temperature.

The vehicle component can be a suspension, and the method can further include actuating the suspension to raise a front end of the vehicle.

The vehicle component can be a front hood of the vehicle, and the method can further include opening the front hood.

The vehicle component can be a propulsion, and the method can further include identifying a roadway having a road grade greater than a road grade threshold and actuating the propulsion to move the vehicle to the identified roadway.

The vehicle component can be a propulsion, and the method can further include determining a wind direction and to actuate the propulsion to align the vehicle along the wind direction.

The method can further include collecting a plurality of measurements of the engine coolant temperature and predicting the engine coolant temperature at the expected time of activation of the vehicle based on the measurements. Each of the plurality of measurements can be collected at a predetermined period of time that is measured from one of a previous measurement and a time of deactivation of the vehicle.

The method can further include detecting an insolation on the vehicle and to actuate the propulsion to move the vehicle when the insolation is above an insolation threshold. The method can further include identifying a location having an insolation below the insolation threshold and to actuate the propulsion to move the vehicle to the location.

FIG. 1 illustrates a system 100 for performing a fuel line leak diagnostic in a vehicle 101. A computer 105 in the vehicle 101 is programmed to receive collected data 115 from one or more sensors 110. For example, vehicle 101 data 115 may include a location of the vehicle 101, a location of a target, etc. Location data may be in a known form, e.g., geo-coordinates such as latitude and longitude coordinates obtained via a navigation system, as is known, that uses the Global Positioning System (GPS). Further examples of data 115 can include measurements of vehicle 101 systems and components, e.g., a vehicle 101 velocity, a vehicle 101 trajectory, etc.

The computer 105 is generally programmed for communications on a vehicle 101 network, e.g., including a communications bus, as is known. Via the network, bus, and/or other wired or wireless mechanisms (e.g., a wired or wireless local area network in the vehicle 101), the computer 105 may transmit messages to various devices in a vehicle 101 and/or receive messages from the various devices, e.g., controllers, actuators, sensors, etc., including sensors 110. Alternatively or additionally, in cases where the computer 105 actually comprises multiple devices, the vehicle network may be used for communications between devices represented as the computer 105 in this disclosure. In addition, the computer 105 may be programmed for communicating with the network 125, which, as described below, may include various wired and/or wireless networking technologies, e.g., cellular, Bluetooth®, Bluetooth® Low Energy (BLE), wired and/or wireless packet networks, etc.

The data store 106 may be of any known type, e.g., hard disk drives, solid state drives, servers, or any volatile or non-volatile media. The data store 106 may store the collected data 115 sent from the sensors 110.

Sensors 110 may include a variety of devices. For example, as is known, various controllers in a vehicle 101 may operate as sensors 110 to provide data 115 via the vehicle 101 network or bus, e.g., data 115 relating to vehicle speed, acceleration, position, and/or component status, etc. Further, other sensors 110 could include cameras, motion detectors, etc., i.e., sensors 110 to provide data 115 for evaluating a location of a target, projecting a path of a target, evaluating a location of a roadway lane, etc. The sensors 110 could also include short range radar, long range radar, LIDAR, and/or ultrasonic transducers.

Collected data 115 may include a variety of data collected in a vehicle 101. Examples of collected data 115 are provided above, and moreover, data 115 are generally collected using one or more sensors 110, and may additionally include data calculated therefrom in the computer 105, and/or at the server 130. In general, collected data 115 may include any data that may be gathered by the sensors 110 and/or computed from such data.

The vehicle 101 may include a plurality of vehicle components 120. As used herein, each vehicle component 120 includes one or more hardware components adapted to perform a mechanical function or operation—such as moving the vehicle, slowing or stopping the vehicle, steering the vehicle, etc. Non-limiting examples of components 120 include a propulsion component (that includes, e.g., an internal combustion engine and/or an electric motor, etc.), a transmission component, a steering component (e.g., that may include one or more of a steering wheel, a steering rack, etc.), a brake component, a park assist component, an adaptive cruise control component, an adaptive steering component, and the like.

The computer 105 may actuate the components 120 to, e.g., brake and/or slow and/or stop the vehicle 101, to avoid targets, etc. The computer 105 may be programmed to operate some or all of the components 120 with limited or no input from a human operator, i.e., the computer 105 may be programmed to operate the components 120. When the computer 105 operates the components 120, the computer 105 can ignore input from the human operator with respect to components 120 selected for control by the computer 105, which provides instructions, e.g., via a vehicle 101 communications bus and/or to electronic control units (ECUs) as are known, to actuate vehicle 101 components, e.g., to apply brakes, change a steering wheel angle, etc. For example, if the human operator attempts to turn a steering wheel during steering operation, the computer 105 may ignore the movement of the steering wheel and steer the vehicle 101 according to its programming.

When the computer 105 operates the vehicle 101, the vehicle 101 is an "autonomous" vehicle 101. For purposes of this disclosure, the term "autonomous vehicle" is used to refer to a vehicle 101 operating in a fully autonomous mode. A fully autonomous mode is defined as one in which each of vehicle 101 propulsion (typically via a powertrain including an electric motor and/or internal combustion engine), braking, and steering are controlled by the computer 105 and not a human operator. A semi-autonomous mode is one in which at least one of vehicle 101 propulsion (typically via a powertrain including an electric motor and/or internal combustion engine), braking, and steering are controlled at least partly by the computer 105 as opposed to a human operator.

The system 100 may further include a network 125 connected to a server 130 and a data store 135. The computer 105 may further be programmed to communicate with one or more remote sites such as the server 130, via the network 125, such remote site possibly including a data store 135. The network 125 represents one or more mechanisms by which a vehicle computer 105 may communicate with a remote server 130. Accordingly, the network 125 may be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, BLE, IEEE 802.11, vehicle-to-vehicle (V2V) such as Dedicated Short Range Communications (DSRC), etc.), local area networks (LAN) and/or wide area networks (WAN), including the Internet, providing data communication services.

The vehicle 101 can include a coolant temperature sensor 140. The coolant temperature sensor 140 can measure a temperature of engine coolant for the propulsion 120. That is, the coolant temperature can be measured as a proxy for the fuel temperature, and thus the computer 105 can use the coolant temperature as measured by the coolant temperature sensor 140 to determine whether the fuel temperature has cooled enough to perform the fuel line diagnostic.

The vehicle 101 can include an ambient temperature sensor 145. The ambient temperature sensor 145 can measure an ambient air temperature outside of the vehicle 101. Based on the ambient temperature measured by the ambient temperature sensor 145 and the coolant temperature measured by the coolant temperature sensor 140, the computer 105 can determine whether to perform the fuel line diagnostic or to actuate one or more vehicle components 120 to dissipate heat from the vehicle 101 to reduce the engine coolant temperature.

Figure 2:
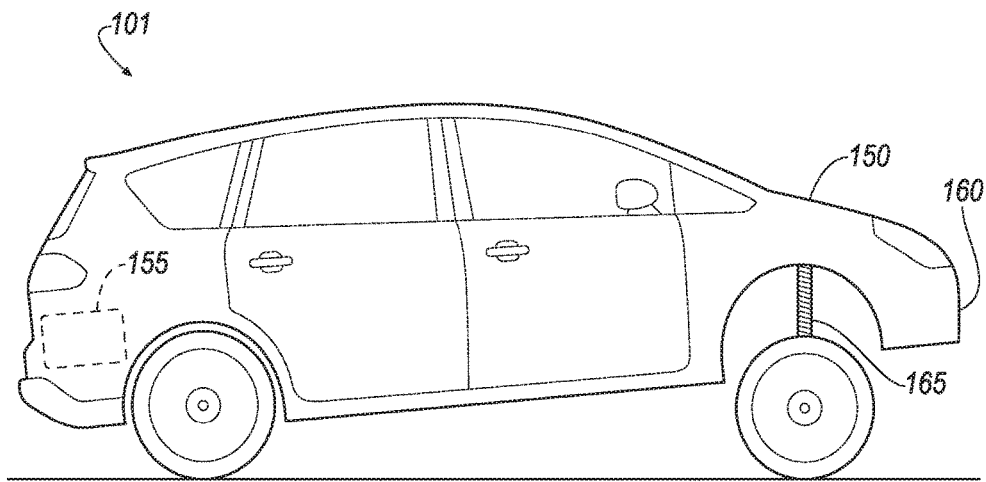
FIG. 2 is a view of an example vehicle with a suspension raised to cool a fuel tank.

FIG. 2 illustrates an example vehicle 101. The vehicle 101 includes a vehicle hood 150. The vehicle hood 150 covers a front portion of the vehicle 101, including the propulsion 120 (e.g., an internal combustion engine). The vehicle hood 150 can be hingedly connected to a vehicle 101 frame.

The vehicle 101 can include a fuel tank 155. The fuel tank 155 can store fluid fuel for use by the propulsion 120, e.g., gasoline, diesel, ethanol, butanol, natural gas, hydrogen, etc. The fuel tank 155 can be connected to a fuel line (not shown) that connects the fuel tank 155 to the propulsion 120. That is, the fuel can travel from the fuel tank 155 through the fuel line to the propulsion 120. However, the fuel tank 155 and/or the fuel line may have a leak, and fuel may escape through the leak.

The computer 105 can perform a fuel line leak diagnostic, as is known, to detect leaks in the fuel line. For example, an On-Board Diagnostic II (OBD-II) standard can require a fuel line leak diagnostic to detect leaks in the fuel line as small as 0.02" (two-hundredths of one inch) in diameter. When the vehicle 101 is operating, the temperature of the fuel tank 155 can increase, causing fuel in the fuel tank 155 to evaporate. The evaporated fuel can affect the fuel line leak diagnostic by introducing noise into the data 115 collected during the fuel line leak diagnostic, potentially affecting the result of the diagnostic. Thus, prior to performing the fuel line leak diagnostic, the fuel tank 155 should cool to below a predetermined temperature to reduce the evaporated fuel from the fuel tank 155. As used herein, the vehicle 101 is "deactivated" when the computer 105 instructs the propulsion 120 to shut off, e.g., to stop consuming fuel and to allow an internal combustion engine to stop. Furthermore, the vehicle 101 is "activated" or "reactivated" when the computer 105 instructs the propulsion 120 to start, e.g., to combust fuel to move components (e.g., pistons) in the internal combustion engine.

Typically, the vehicle 101 can be deactivated for 5-9 hours to cool the fuel tank 155 to perform the fuel line leak diagnostic. However, the vehicle 101 may not have a period of deactivation of 5-9 hours prior to the next scheduled use of the vehicle 101, e.g., if the vehicle 101 is an autonomous service vehicle 101. For example, an autonomous service vehicle 101 may be programmed to operate for a specific period of time, e.g., a daily service period, where the vehicle 101 is activated without a period of deactivation long enough to cool the fuel tank 155. Thus, the computer 105 can be programmed to actuate one or more countermeasures to cool the fuel tank 155 prior to performing the diagnostic.

While the temperature of the fuel tank 155 may not be measured by a temperature sensor, a measurement of the engine coolant temperature may serve as a proxy for temperature of the fuel tank 155. The fuel in the fuel tank 155 typically cools faster than the engine coolant. Thus, measuring the engine coolant temperature can provide an upper bound for the temperature of the fuel in the fuel tank. Based on measurements of the engine coolant temperature from the coolant temperature sensor 140, the computer 105 can determine whether the temperature of the fuel tank 155 is low enough to perform the fuel line leak diagnostic. Furthermore, residual heat held by the engine and the engine coolant can radiate to other parts of the vehicle 101, including the fuel tank 155. Thus, cooling the engine and the engine coolant allows the fuel tank 155 to cool more quickly.

To dissipate heat from the vehicle 101 and reduce the engine coolant temperature, the computer 105 can raise a front end 160 of the vehicle 101. The computer 105 can actuate a front suspension 165 to raise the front end 160 of the vehicle 101, allowing the hot engine coolant to dissipate heat away from the fuel tank 155, cooling the engine and the engine coolant. The cooler engine and engine coolant allows the fuel tank 155 to cool more quickly.

Figure 3:
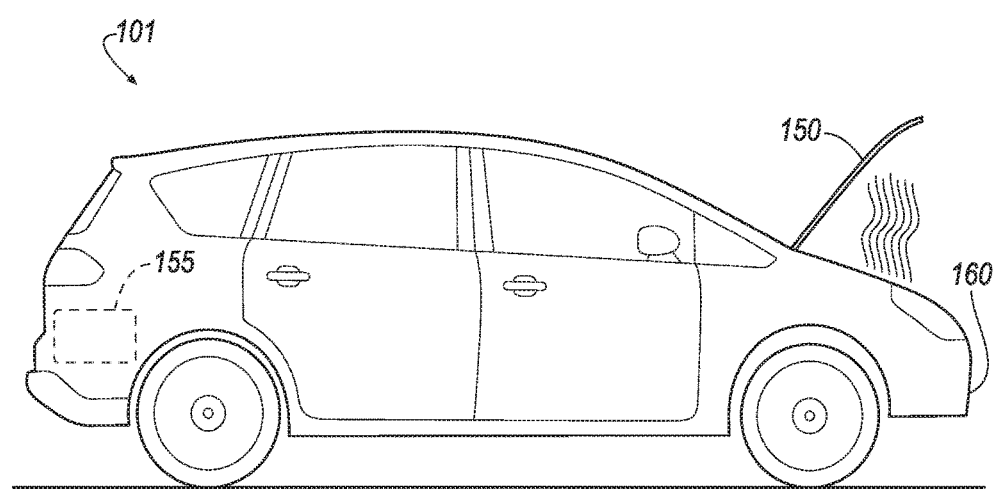
FIG. 3 is a view of the example vehicle with a vehicle hood opened to cool a vehicle propulsion.

FIG. 3 illustrates the vehicle 101 cooling the engine coolant by raising the vehicle hood 150. The computer 105 can actuate a lock and an automatic opener in the hood 150 to open and raise the hood 150, exposing the engine and coolant lines to cooler ambient air. The cooler ambient air can absorb heat from the engine, reducing the temperature of the engine and the engine coolant. The engine and the fuel tank 155 can thus cool more quickly.

Figure 4:
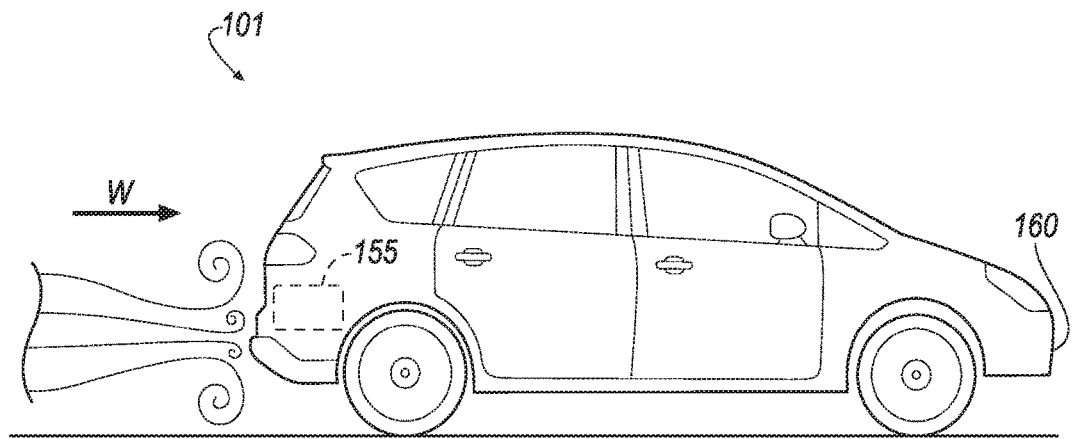
FIG. 4 is a view of the example vehicle aligned with a wind direction to cool a fuel tank.

FIG. 4 illustrates the vehicle 101 cooling the fuel tank 155 by aligning the vehicle 101 with a wind direction W. The vehicle 101 can include one or more sensors 110 that can detect a wind speed and the wind direction W. Alternatively or additionally, the computer 105 can receive weather data 115 from the server 130, including data 115 on a current wind speed and wind direction W. The computer 105 can actuate the propulsion 120 to move the vehicle 101 so that the wind moving in the wind direction W flows over the fuel tank 155. The moving wind can cool the fuel tank 155 more quickly than still air. Additionally or alternatively, the computer 105 can identify a building having a height above a height threshold and move the vehicle 101 into a downdraft of the building. The wind can, upon striking the building at a height above the height threshold, move down a side of the building until reaching the ground. The wind moving down the side of the building is a "downdraft." The height threshold can be determined using known techniques to estimate a building height that, given a detected wind speed, is predicted to generate a downdraft of sufficient force. The wind in the downdraft can have a higher speed and higher flow rate than the wind on an open road, so moving the vehicle 101 into the downdraft can increase the heat dissipation of the fuel tank 155.

Figure 5:
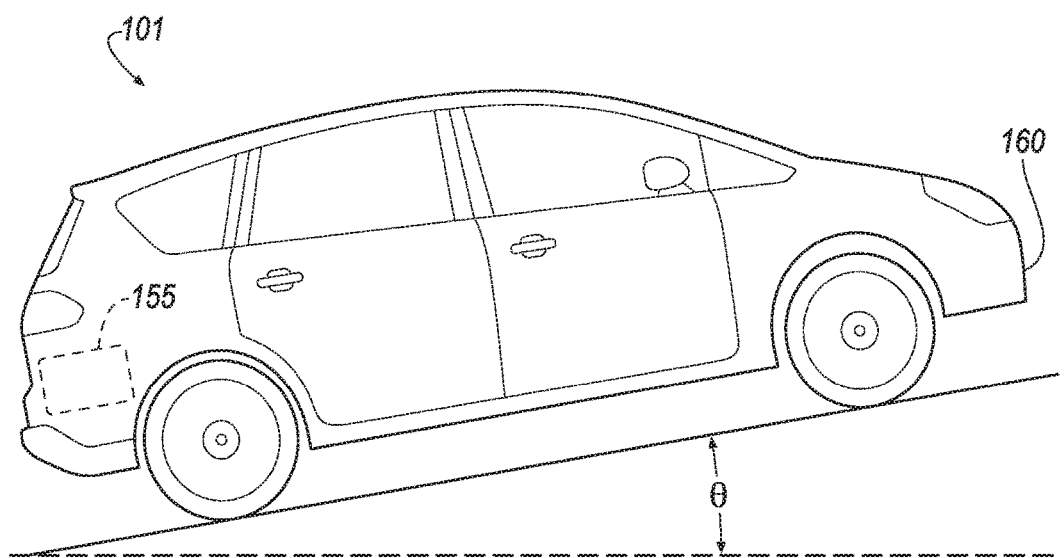
FIG. 5 is a view of the example vehicle on a roadway with a road grade placing a front end of the vehicle above the fuel tank.

FIG. 5 illustrates the vehicle 101 cooling the fuel tank 155 by parking on an inclined road. The computer 105 can receive data 115 from the server 130 of a road grade θ (i.e., an angle of a road above flat ground) of nearby roads. The computer 105 can identify a road having a road grade θ above a road grade threshold and move the vehicle 101 to the road. The computer 105 can park the vehicle 101 so that the front end 160 is disposed higher than the fuel tank 155, allowing heat to dissipate from the propulsion 120 and away from the fuel tank 155.

The computer 105 can cool the fuel tank 155 by reducing an insolation (i.e., exposure to the sun's rays) on the vehicle 101. The insolation can be measured in units of power per area per time, e.g., $kWhr/m^2/day$. Sunlight can increase the temperature of the fuel tank 155, and the computer 105 can identify a location with less sunlight (e.g., in shade) to reduce the temperature of the fuel tank 155. The computer 105 can measure an insolation on the vehicle 101 using an insolation sensor 110, e.g., a camera that measures a solar irradiance, a solar panel that measures an electric charge generated by a photovoltaic cell, etc. When the insolation is above an insolation threshold, the computer 105 can actuate a propulsion 120 to move the vehicle 101 to a location with an insolation below the insolation threshold. For example, the insolation threshold can be 4 $kWhr/m^2/day$, and can be based on previously measured solar insolation data 115 for a location near the vehicle 101. The insolation threshold can be stored in the data store 106 and/or the server 130. The computer 105 can identify a location having an insolation below the insolation threshold based on, e.g., solar radiation map information stored in the server 130, predetermined areas in shade (e.g., a covered parking structure), etc. The computer 105 can actuate the propulsion 120 to reduce the insolation on the vehicle 101 in conjunction with one or more of the other countermeasures described above, e.g., the computer 105 can identify a location having a road grade above the road grade threshold, as shown in FIG. 5, and having an insolation below the insolation threshold.

Figure 6:
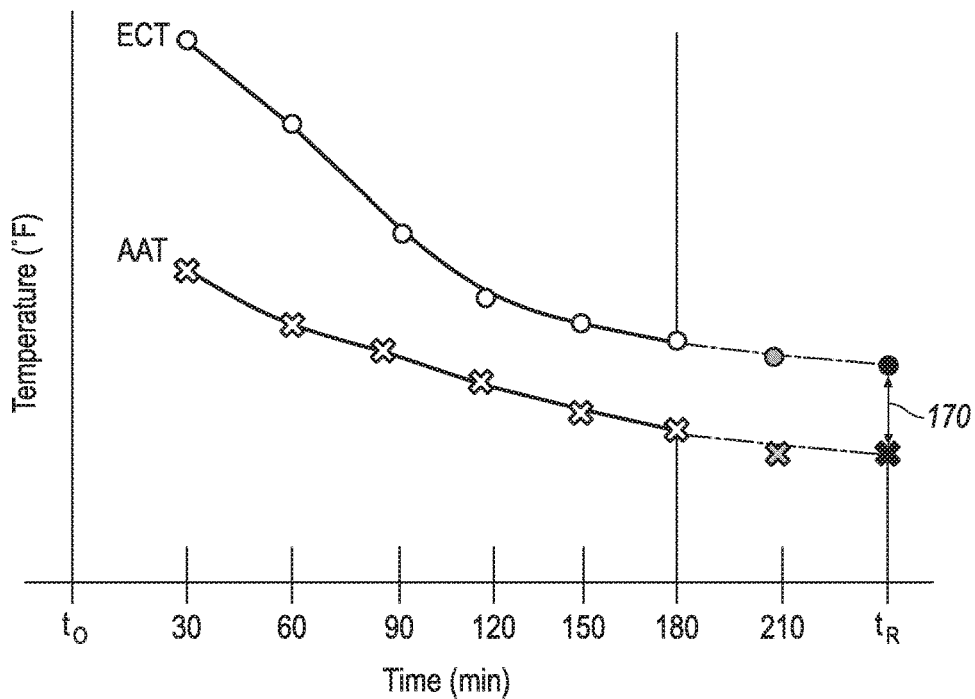
FIG. 6 is an example chart of an engine coolant temperature and an ambient air temperature.
Figure 7:
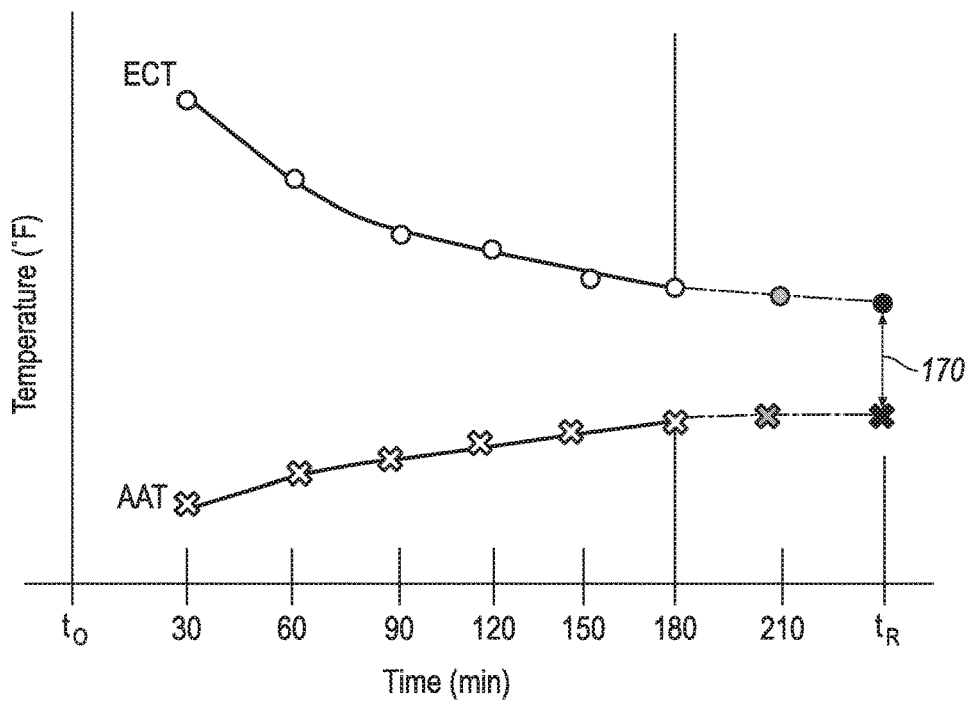
FIG. 7 is another example chart of the engine coolant temperature and the ambient air temperature.

FIGS. 6-7 illustrate example measurements from the engine coolant temperature sensor 140 and the ambient air temperature sensor 145. The vertical axis is temperature in degrees Fahrenheit. The horizontal axis is time in minutes elapsed from deactivation of the vehicle 101. FIGS. 6-7 illustrates measurements of the engine coolant temperature (ECT) (marked as circles in FIGS. 6-7) and the ambient air temperature (AAT) (marked at crosses in FIGS. 6-7) from a deactivation time $t_0$ of the vehicle 101 to an expected reactivation time $t_R$ of the vehicle 101. As described above, the vehicle 101 can be activated for a daily service period. The deactivation time $t_0$ can indicate an end of a current daily service period and the reactivation time $t_R$ can indicate a start of a subsequent daily service period.

The computer 105 can predict the ECT and AAT at the expected reactivation time $t_R$ to determine whether to actuate one or more countermeasures. The computer 105 can measure the ECT and the AAT at predetermined time intervals after the deactivation time $t_0$ and/or a previous measurement of the ECT and the AAT to determine whether the fuel tank 155 will cool enough at the reactivation time $t_R$ to run the fuel line leak diagnostic. In the examples of FIGS. 6-7, the computer 105 determines the ECT and AAT at 30-minute intervals starting at the deactivation time $t_0$. At a predetermined time prior to the reactivation time $t_R$, the computer 105 can use known regression techniques to predict the ECT and the AAT at the reactivation time $t_R$. The computer 105 can perform, e.g., a linear regression, a logistic regression, a polynomial regression, a least squares regression, etc., on the measurements of the ECT and the AAT to generate a function to predict the ECT and the AAT at a specific time, e.g., the reactivation time $t_R$. In the examples of FIG. 6-7, the computer 105 can predict the ECT and the AAT 60 minutes prior to the reactivation time $t_R$. In the examples of FIGS. 6-7, the measurements for the ECT and the AAT are hollow circles and crosses, respectively, and the predicted values for the ECT and the AAT are solid for the reactivation time $t_R$ and shaded for time intervals between the reactivation time $t_R$ and the time of calculating the prediction of the ECT and the AAT at the reactivation time $t_R$ (60 minutes prior to the expected reactivation time $t_R$ in FIGS. 6-7).

Based on a difference between the predicted ECT and AAT, the computer 105 can determine whether to actuate one or more countermeasures to cool the fuel tank 155. The computer 105 can actuate the countermeasures at a time based on the expected reactivation time $t_R$. For example, the computer 105 can actuate the countermeasures 30 minutes prior to the reactivation time $t_R$, 60 minutes prior to the reactivation time $t_R$, etc.

The computer 105 can determine a difference 170 between the predicted value of the ECT and the predicted value of the AAT at the reactivation time $t_R$. When the difference 170 is below a temperature threshold (i.e., the ECT is within a temperature threshold of the AAT), the computer 105 can determine that the fuel tank 155 will cool sufficiently to perform the fuel line leak diagnostic at the reactivation time $t_R$. When the difference 170 is above the temperature threshold, the computer 105 can actuate one or more components 120 to perform one or more of the countermeasures described above and shown in FIGS. 2-5. The temperature threshold can be a predetermined value stored in the data store 106 and/or the server 130 and based on known standards for fuel line leak diagnostics and volatility of liquid fuels. For example, the temperature threshold can be 12 degrees Fahrenheit. In the example of FIG. 6, the difference 170 is below the temperature threshold, and the computer 105 can thus decide not to perform any countermeasures to cool the fuel tank 155. In the example of FIG. 7, the difference 170 is greater than the temperature threshold, and the computer 105 can thus decide to perform one or more of the countermeasures described above.

Figure 8:
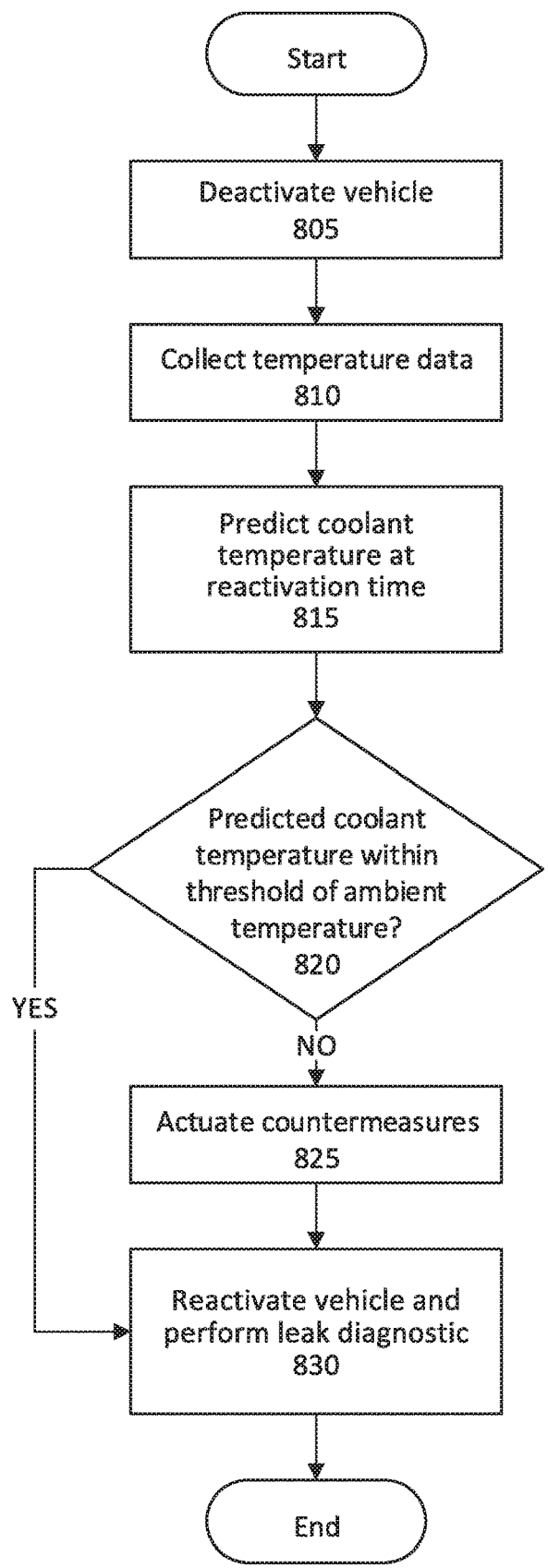
FIG. 8 is a block diagram of an example process for performing the fuel line leak diagnostic.

FIG. 8 illustrates an example process 800 for cooling a fuel tank 155 in a vehicle 101. The process 800 begins in a block 805, in which the computer 105 deactivates the vehicle 101. That is, as described above, the vehicle 101 deactivates one or more vehicle components 120 (e.g., the propulsion) after a daily service period. The computer 105 can deactivate the vehicle 101 at the deactivation time $t_0$ and reactivate the vehicle 101 at the reactivation time $t_R$.

Next, in a block 810, the computer 105 actuates a coolant temperature sensor 140 and an ambient temperature sensor 145 to collect temperature data 115 of the engine coolant and the ambient air. The computer 105 can collect data 115 of the ECT and the AAT at predetermined intervals of time starting at the deactivation time $t_0$. The intervals of time can be, e.g., 30 minutes.

Next, in a block 815, the computer 105 uses the temperature data 115 to predict the coolant temperature ECT at the expected reactivation time $t_R$. The computer 105 can further predict the ambient air temperature AAT at the expected reactivation time $t_R$. As described above and shown in FIGS. 6-7, the computer 105 can, at a predetermined time before the reactivation time $t_R$, use the measurements of the ECT and AAT to predict the ECT and the AAT at the reactivation time $t_R$ using known regression techniques.

Next, in a block 820, the computer 105 determines whether the predicted ECT is within a predetermined temperature threshold of a predicted AAT. The computer 105 can determine a difference 170 between the predicted ECT and the predicted AAT at the reactivation time $t_R$. The computer 105 can compare the difference 170 to the predetermined temperature threshold to determine whether the fuel tank 155 will cool enough to perform the fuel line leak diagnostic. The predetermined temperature threshold can be, e.g., 12 degrees Fahrenheit. When the difference 170 is below the temperature threshold, the process 800 continues in a block 830. Otherwise, the process 800 continues in a block 825.

In the block 825, the computer 105 actuates one or more countermeasures to reduce the temperature of the fuel tank 155. For example, the computer 105 can actuate a suspension 165 to raise a front end of the vehicle 101 above the fuel tank 155. In another example, the computer 105 can move the vehicle 101 to align with a wind direction W so that the wind flows over the fuel tank 155, cooling the fuel tank 155.

In the block 830, the computer 105 reactivates the vehicle 101 at the reactivation time $t_R$ and performs the fuel line leak diagnostic. Following the block 830, the process 800 ends.

As used herein, the adverb "substantially" modifying an adjective means that a shape, structure, measurement, value, calculation, etc. may deviate from an exact described geometry, distance, measurement, value, calculation, etc., because of imperfections in materials, machining, manufacturing, data collector measurements, computations, processing time, communications time, etc.

Computers 105 generally each include instructions executable by one or more computers such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computer 105 is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. For example, in the process 800, one or more of the steps could be omitted, or the steps could be executed in a different order than shown in FIG. 8. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

The article "a" modifying a noun should be understood as meaning one or more unless stated otherwise, or context requires otherwise. The phrase "based on" encompasses being partly or entirely based on.

What is claimed is:

1. A system, comprising a computer including a processor and a memory, the memory storing instructions executable by the processor to:
    predict an engine coolant temperature at an expected time of activation of a vehicle;
    predict an ambient air temperature at the expected time of activation;
    upon determining that the predicted engine coolant temperature is greater than the predicted ambient air temperature by a temperature threshold, actuate a vehicle component at a time determined based on the expected time of activation; and
    perform a fuel line leak diagnostic at the expected time of activation when the predicted engine coolant temperature is within the temperature threshold of the predicted ambient air temperature.

2. The system of claim 1, wherein the vehicle component is a suspension and the computer is further programmed to actuate the suspension to raise a front end of the vehicle.

3. The system of claim 1, wherein the vehicle component is a front hood of the vehicle and the computer is further programmed to open the front hood.

4. The system of claim 1, wherein the vehicle component is a propulsion and the computer is further programmed to identify a roadway having a road grade greater than a road grade threshold and to actuate the propulsion to move the vehicle to the identified roadway.

5. The system of claim 1, wherein the vehicle component is a propulsion and the computer is further programmed to determine a wind direction and to actuate the propulsion to align the vehicle along the wind direction.

6. The system of claim 1, wherein the instructions further include instructions to collect a plurality of measurements of the engine coolant temperature and to predict the engine coolant temperature at the expected time of activation of the vehicle based on the measurements.

7. The system of claim 6, wherein each of the plurality of measurements is collected at a predetermined period of time that is measured from one of: a previous measurement and a time of deactivation of the vehicle.

8. The system of claim 1, wherein the instructions further include instructions to detect an insolation on the vehicle and to actuate a propulsion to move the vehicle when the insolation is above an insolation threshold.

9. The system of claim 8, wherein the instructions further include instructions to identify a location having an insolation below the insolation threshold and to actuate the propulsion to move the vehicle to the location.

10. A method, comprising:
    predicting an engine coolant temperature at an expected time of activation of a vehicle;
    predicting an ambient air temperature at the expected time of activation;
    upon determining that the predicted engine coolant temperature is greater than the predicted ambient air temperature by a temperature threshold, actuating a vehicle component at a time based on the expected time of activation; and
    performing a fuel line leak diagnostic at the expected time of activation when the predicted engine coolant temperature is within the temperature threshold of the predicted ambient air temperature.

11. The method of claim 10, wherein the vehicle component is a suspension, and the method further comprises actuating the suspension to raise a front end of the vehicle.

12. The method of claim 10, wherein the vehicle component is a front hood of the vehicle, and the method further comprises opening the front hood.

13. The method of claim 10, wherein the vehicle component is a propulsion, and the method further comprises identifying a roadway having a road grade greater than a road grade threshold and actuating the propulsion to move the vehicle to the identified roadway.

14. The method of claim 10, wherein the vehicle component is a propulsion, and the method further comprises determining a wind direction and to actuate the propulsion to align the vehicle along the wind direction.

15. The method of claim 10, further comprising collecting a plurality of measurements of the engine coolant temperature and predicting the engine coolant temperature at the expected time of activation of the vehicle based on the measurements.

16. The method of claim 15, wherein each of the plurality of measurements is collected at a predetermined period of time that is measured from one of: a previous measurement and a time of deactivation of the vehicle.

17. The method of claim 10, further comprising detecting an insolation on the vehicle and to actuate a propulsion to move the vehicle when the insolation is above an insolation threshold.

18. The method of claim 17, further comprising identifying a location having an insolation below the insolation threshold and to actuate the propulsion to move the vehicle to the location.

* * * * *